United States Patent [19]

Glynn et al.

[11] Patent Number: 5,104,904

[45] Date of Patent: Apr. 14, 1992

[54] USE OF AROMATIC PETROLEUM OILS AS SURFACTANT FOR POLYURETHANE FOAMS

[75] Inventors: Keith T. Glynn, Hoboken, N.J.; Earl N. Doyle, Houston, Tex.

[73] Assignee: Crowley Chemical Co., New York, N.Y.

[21] Appl. No.: 512,965

[22] Filed: Apr. 23, 1990

[51] Int. Cl.$^5$ .............................................. C08G 18/08
[52] U.S. Cl. ......................................... 521/99; 521/110; 521/114; 521/116; 521/128; 521/129; 521/131; 521/132; 521/172; 252/182.2
[58] Field of Search ............... 252/182.2; 521/99, 128, 521/131, 110, 114, 116, 132, 172, 129

[56] References Cited

U.S. PATENT DOCUMENTS

| | | | |
|---|---|---|---|
| 3,152,081 | 10/1964 | Ovist et al. | 252/57 |
| 3,214,365 | 10/1965 | Zoeller | 208/21 |
| 3,314,903 | 4/1967 | Belak et al. | 521/132 |
| 3,755,215 | 8/1973 | Khoury et al. | 521/132 |
| 3,959,176 | 5/1976 | Mahn et al. | 252/352 |
| 4,124,518 | 11/1978 | Stone et al. | 252/91 |
| 4,160,076 | 7/1979 | Guthrie et al. | 521/159 |
| 4,172,186 | 10/1979 | Scott et al. | 521/112 |
| 4,195,008 | 3/1980 | Gruber | 260/29.7 |
| 4,210,726 | 7/1980 | Hamamura et al. | 521/110 |
| 4,248,811 | 2/1981 | Doyle et al. | 264/46.6 |
| 4,309,508 | 1/1982 | Baskent et al. | 521/112 |
| 4,331,555 | 5/1982 | Baskent et al. | 252/351 |
| 4,337,318 | 6/1982 | Doyle | 521/80 |
| 4,346,133 | 8/1982 | Hipchen et al. | 428/109 |
| 4,386,983 | 6/1983 | Hipchen et al. | 156/79 |
| 4,560,482 | 12/1985 | Canevari | 210/749 |
| 4,572,919 | 2/1986 | Londrigan | 521/115 |
| 4,769,174 | 9/1988 | Kilgour | 252/351 |

*Primary Examiner*—Maurice J. Welsh
*Assistant Examiner*—Rachel Johnson
*Attorney, Agent, or Firm*—Morgan & Finnegan

[57] ABSTRACT

Hydrocarbon oils having a high aromaticity (at least 85%, preferably 95-100%) and a boiling point of about 342° to about 510° C. (about 650° to about 950° F.) are used as partial or total replacements for the foam stabilizers used in the preparation of both rigid, closed cell polyurethane foams and flexible, open cell polyurethane foams. These oils are useful as a replacement for both silicon surfactants and organic (i.e., non-silicon) surfactants. For certain blowing agents (e.g., trichlorofluoromethane and methylene chloride), hydrocarbon oils having a boiling point range of about 399° to 454° C. (about 750° to about 850° F.) are preferred. Highly aromatic oils having a boiling point of about 281° to about 510° C. are useful for reducing the vapor pressure of toluene diisocyanate and for preventing the low temperature crystallization of toluene diisocyanate or diphenylmethane diisocyanate.

30 Claims, No Drawings

USE OF AROMATIC PETROLEUM OILS AS SURFACTANT FOR POLYURETHANE FOAMS

BACKGROUND OF THE INVENTION

This invention relates to the use of aromatic hydrocarbon oils as total or partial replacements for the surfactants used in rigid and flexible polyurethane foams.

It is known in the manufacturer of solid polyurethane resins to extend the compositions with aromatic hydrocarbon oils. See U.S. Pat. No. 3,846,355 which discloses the use of paraffinic or olefinic hydrocarbon oils low in aromatic content, preferably high boiling petroleum fractions such as mineral oils, fuel oils, kerosenes, and conventional lubricating oils having a boiling point at atmospheric pressure of about 150° C. (302° F.), in amounts of at least 20 wt. % as extenders. It is also known in the manufacture of foamed flexible polyurethanes to use hydrocarbon oil extenders to plasticize and lower the end cost of a formulation (in amounts of 20% by weight or above). Coal tar products have also been used to replace part of the polyols used in the preparation of flexible polyurethanes.

It is known in the manufacturer of cellular polymeric materials such as polyurethane foams to use small quantities of various cell stabilizing additives in order to improve the foam's quality. The various foam stabilizers used have included polysiloxanes (see U.S. Pat. No. 2,901,445); trihalo alkyl silanes (U.S. Pat. No. 3,061,556); polydimethylsiloxane-polyoxy-alkylene copolymers (U.S. Pat. No. 4,031,044); copolymers consisting of polydimethylsiloxanes to which are attached various pendant groups (U.S. Pat. Nos. 2,901,445; 3,905,924; 3,839,384; 4,306,035; 3,884,847; 4,110,272; 4,067,828; 4,039,490); polysiloxanepolyoxyalkylene copolymers where the polyoxyalkylalkylene portions are end-capped (U.S. Pat. No. 4,478,957); polyether silicone copolymers with hydroxy terminated pendant groups (U.S. Pat. No. 4,769,174); a mixture of a high molecular weight silicone-oxyalkylene copolymer with a low molecular weight siloxane-oxyalkylene copolymer (U.S. Pat. No. 4,119,582); low viscosity alkoxy-modified siloxanes and low viscosity dimethylsilicone oils (U.S. Pat. No. 4,042,540); cyanosiloxanes (U.S. Pat. No. 3,905,924); aralkylsiloxanes (U.S. Pat. No. 3,839,384); siloxane-oxyalkylene copolymers and mixtures thereof with each other or with dimethylsilicone oils (see U.S. Pat. No. 3,741,917); high molecular weight silicate esters of polyether alcohols (U.S. Pat. No. 3,935,133); organosiloxane copolymers containing $C_5$-$C_{20}$ alkyl groups (U.S. Pat. No. 4,299,923); low molecular weight $C_5$-$C_{18}$- alkoxysilicone compositions containing from 1 to 18 silicone atoms (U.S. Pat. No. 4,306,035); siloxane copolymer mixtures (U.S. Pat. No. 4,309,508); unsaturated polyoxyalkylene adduct/fumarate diester reaction products (U.S. Pat. No. 4,572,919); capped reaction products of an alkoxylated amine and a copolymerizable mixture of dialkyl maleate and N-vinyl-2-pyrrolidinone or N-vinyl caprolactam (U.S. Pat. No. 4,140,842); and polyoxyalkylene/unsaturated diester reaction products (U.S. Pat. No. 4,365,024).

Many of the the above stabilizers (often referred to as surfactants) are relatively expensive and can cause problems. For example, in the production of flexible polyurethane foams, the well-known polysiloxane-polyoxy-alkylene copolymers used as foam stabilizers cause the resulting foam to shrink to such an extent that it is difficult or impossible to obtain an open cell structure even by crushing the cell membranes. If no foam stabilizer is used, the foam becomes very coarse and the foam collapses. For example, the well-known silicone and siloxane surfactants, when used with tin catalysts, cause foam shrinkage making it necessary to carefully control the ratio of tin to silicone to obtain the desired open cell structure. This problem is referred to as "tin sensitivity".

In order to overcome the problem with the polysiloxane-polyoxyalkylene foam stabilizers, a mixture of an organosilicone oil, a hydrocarbon oil, and optionally a fatty acid ester is used (see U.S. Pat. No. 4,210,726). The hydrocarbon oil used in the mixture includes preferably alicyclic hydrocarbon oils and aromatic hydrocarbon oils and paraffin oils containing more than 20% by weight alicyclic hydrocarbon oil and/or aromatic hydrocarbon oil. The exemplified oils were cycloparaffinic (napthene) hydrocarbon oils. It is stated that other hydrocarbon oils do not exhibit good performance as foam stabilizers because of lack of compatibility with the foam composition. It is demonstrated that the combination of oils is important and that, without the cycloparaffinic hydrocarbon oil, the organsilicone oil separated from the polyol/water mixture.

While the use of this composition allowed the foam to be crushed, today only a small percentage of foam is crushed to open the cells. Rather the amount of tin catalyst to silicone surfactant used are carefully controlled, which can be limiting in terms of rise, gel, and cure times.

Accordingly, it would be economically desirable to provide a product which can be used as a partial or total replacement for the conventional surfactants used as foam stabilizers in both rigid and flexible foams. It would be particularly useful to replace all or part of the silicone surfactants used in flexible foams with a foam stabilizer which is not tin-sensitive.

SUMMARY OF THE INVENTION

Hydrocarbon oils having a high aromaticity (at least 85%, preferably 95–100%) and a boiling point of about 342° to about 510° C. (about 650° to about 950° F.) are used as partial (e.g., about 70 to about 90%) or total replacements for the foam stabilizers used in the preparation of both rigid, closed cell polyurethane foams and flexible, open cell polyurethane foams. As used herein, the term rigid polyurethane foam includes urethanes having an isocyanate index of about 1.1, modified isocyanurates having an isocyante index of about 1.1 to about 3.0, and pure isocyanurates having an isocyanate index of above about 3.0. These oils are useful as a replacement for both silicone surfactants and organic (i.e., non-silicone) surfactants. For certain blowing agents (e.g., trichlorofluoromethane and methylene chloride), hydrocarbon oils having a boiling point range of about 399° to 454° C. (about 750° to about 850° F.) are preferred.

Not all hydrocarbon oils are suitable for use herein as replacements for the foam stabilizers. For example, non-aromatic hydrocarbon oils, as well as aromatic hydrocarbon oils of lower aromaticity and/or lower boiling point, are not satisfactory.

These highly aromatic, high boiling hydrocarbon oils are useful in blown foams such as water-blown foams, partial water-blown and Freon-blown foams, Freon-blown foams, methylene chloride-blown foams, carbon dioxide-blown foams, and the like. They are useful with either polyether or polyester polyols and with any of the diisocyanates or polyisocyanates typically used, such as crude diphenylmethane diisocyanates as well as toluene diisocyanates.

The amount of hydrocarbon oil added is based on the weight of the polyol used. It will depend upon whether the oil is being added as a partial or total replacement, whether the foam being prepared is a flexible or rigid foam, and what type of blowing agent is being used. If the hydrocarbon oil is being used as a partial replacement for a silicone surfactant or an organic surfactant in flexible or rigid foams, the amount added will be about 1 to about 10%, preferably about 3 to about 6%, most preferably about 3 to about 4% by weight, based on the polyol component. The amount of silicone or organic surfactants added will be about 0.1 to about 1%, preferably about 0.25 to about 0.30% by weight, based on the polyol component. If the hydrocarbon oil is being used as a total replacement for the surfactants typically used as foam stabilizers, the amount added will be about 2 to about 15%, preferably about 3 to about 8%, most preferably 3.5 to about 5% by weight, based on polyol component. The oil may be added to the diisocyanate or polyisocyanate component and/or polyol component.

One major advantage provided by the use of these highly aromatic, high boiling oils in flexible, open cell foams is that "tin sensitivity" is eliminated. The ratio of tin catalyst need not be carefully controlled in order to avoid closed cell structures and shrinkage since most or all of the silicone surfactant is replaced with the oil. The cells open without crushing, and the tin catalyst levels can be as high as needed to give the desired rise, gel, and cure times.

Another major advantage provided by the use of these highly aromatic, high boiling hydrocarbon oils as a partial or total replacement in rigid, closed cell foams, such as those used in thermal insulation and flotation in boats, is a reduction in cost, an increase in the percentage of closed cells, and a reduction in water absorption without an adverse affect on physical properties such as compressive strength, dimensional stability, or insulative properties (e.g., the "K" factor). The use of higher percentages of the hydrocarbon oils increases the closed cell content and minimizes water absorption of the foam.

Another advantage provided by the use of highly aromatic, high boiling hydrocarbon oils in polyurethane foams is their ability to lower the vapor pressure of toluene diisocyanate and to compatibilize the other components used in the polyurethane formulations. The oils should have an aromaticity of at least 85%, preferably 95-100%, but need not be as high boiling as the oils used as foam stabilizers. Oils having a boiling point of about 281 to about 510° C., preferably about 399 to about 454° C., are suitable. The oils are added in amounts of about 3 to about 10%, preferably about 4 to about 6%, by weight based on the weight of toluene diisocyanate.

A further advantage provided by the use of these highly aromatic, high boiling oils having a boiling point of about 281° to about 510° C. in the toluene diisocyanate or low functionality diphenylmethane diisocyanate component is prevention of the low temperature crystallization of the diisocyanates. The toluene diisocyanate used in flexible, open cell foams is typically an 80/20 mixture of the 2,4- and 2,6-isomers. At about 13° C. (55° F.) and about 8° C. (47° F.) the 2,6-and 2,4-isomers, respectively, start to crystallize. The addition of about 3 to about 8%, preferably about 4 to about 5%, by weight of the oil to the toluene diisocyanate reduces the crystallization temperature to about −12° C. (10° F.). Even after reaching −18° C. (0° F.), the crystallized toluene diisocyanate/oil mixture can be completely reliquefied by warming to 4° C. (40° F.), whereas pure toluene diisocyanate must be heated to about 38°–43° C. (100°–110° F.) and thoroughly mixed to redissolve the crystals. A like amount should be added to the diphenylmethane diisocyanate.

DESCRIPTION OF THE PREFERRED EMBODIMENTS

Suitable hydrocarbon oils having high aromaticity include anthracenes, phenanthrenes, thiophenes, pyrenes, and the like, provided they have the required boiling point range. Mixtures of oils are typically used and include the center cut of aromatic petroleum bottoms.

These oils are useful in various polyurethanes including aromatic polyurethanes based on toluene diisocyanate and diphenylmethane diisocyanate, aliphatic polyurethanes based on hydrogenated methylene diisocyanates, and a wide range of polyurethanes derived from aliphatic diamines. Aromatic type polyurethanes are used where ultraviolet stability is not required. Aliphatic polyurethanes are used where good weathering properties are necessary. The oils are particularly useful in the aromatic polyurethanes.

The oils are useful in both the flexible, open cell foams mostly used in cushioning, such as mattresses, pillows, automotive cushions, and the like and in the rigid, closed cell foams mostly used in thermal insulation applications.

There are many types of polyurethanes due to the wide range of isocyanate pre-polymers that can be used and the very wide range of curatives and polyols available to react with the isocyanates. These include two-component polyurethanes which are cured at room temperature or heat-cured. Polyurethanes containing polyether polyols, polyester polyols, amino polyols, mercapto polyols, and sucrose polyols cure at room temperature. Polyurethanes which are heat cured are cured with aromatic diamines or short chain crosslinkers are used in their preparation.

The polyurethanes referred to herein are thermosetting polyurethanes, not thermoplastic polyurethanes, often called millable urethanes. The oils will not have as great an application in the millable urethanes since these are manufactured to provide the properties desired for the end products. Representative examples of suitable polyisocyanates are disclosed in U.S. Pat. No. 3,061,556 (issued Oct. 30, 1962 to P. G. Gemelnhardt).

The hydrogen donors useful in the preparation of polyurethanes will vary and will depend upon whether a flexible or rigid foam is being prepared. The polyols used in the preparation of flexible foams are generally high-molecular-weight polyethers and polyesters of both difunctional and trifunctional types. The end properties dictate the polyol to be used. They can be any polyether triol containing at least 40 mole percent of primary hydroxyl groups and having a molecular weight from about 700 to about 6,000. Conversely, the polyether triols can contain no more than 60 mole percent of secondary hydroxyl groups. The preferred polyether triols used are polyalkylenether triols obtained by the chemical addition of alkylene oxides to trihydroxyl organic containing materials, such as 1,2,6-hexane-triol, 1,1,1-trimethylolethane, 1,1,1-trimethylolpropane and the like, as well as mixtures thereof. $C_2$–$C_4$-alkylene oxides are employed in producing the preferred polyethers with propylene oxide and mixtures thereof ethylene oxide are especially preferred.

By far the greatest portion of hydrogen donors used in the rigid foams are polyols of high functionality, i.e., polyols having a functionality about 2.2, preferably about 2.2 to about 4.0. Some may be classified as polyethers, aminopolyethers, polyesters, and combinations thereof. Some are chlorinated, phosphorus-containing polyols, used where flame resistance is imperative. The amines sometimes used as a significant portion of the hydrogen donor are quadrifunctional aminopolyethers such as N, N, N', N'-tetrakis(2-hydroxypropyl) ethylene diamine. The polyols can be mixtures consisting essentially of the above defined polyethe triols and other polyether polyols having an average of at least two hydroxyl groups, with the above polyether triols amounting to at least 40 wt. %, preferably at least 50% of the total polyol content of the mixtures. Illustrative of such other polyethers are triols outside of the scope defined above, diols, tetraols and polymer/polyols, and the like, as well as mixtures thereof. Examples of such polyether polyols that can be mixed with the polyether triols include those adducts of alkylene oxide to such polyols as diethylene glycol; dipropylene glycol; pentaetythritol; sorbitol; sucrose; lactose; alpha-methylglucoside; alpha-hydroxyalkyglucoside; novolac resins; ethylene glycol; propylene glycol; trimethylene glycol; 1,2-butylene glycol; 1,3-butanediol; 1,4-butanediol; 1,5-pentanediol; 1,2-hexane glycol; 1,10-decanediol; 1,2-cyclohexanediol; 2-butene-1,4-diol; 3-cyclohexane-1,1-dimethanol; 4-methyl-3-cyclohexenel,1-dimethanol; 3-methylene-1,5-pentanediol; 4-(2-hydroxyethoxy)-1-butanol; and the like, as well as mixtures thereof.

The diisocyanates or polyisocyanate selected will also depend upon whether a flexible or rigid foam is being prepared.

Nearly all the soft foams being manufactured today are manufactured with toluene diisocyanate (TDI), 80/20 isomer content, 2,4 and 2,6 TDI. A little work is done for special foams with 65/35 mixtures of these isomers. More and more work is being done with low functionality diphenylmethane diisocyanate in flexible foams because of the toxicity of the toluene diisocyanate. A very large part of flexible foams are manufactured with a one-shot system.

In the rigid urethane foams, color is seldom of importance, and hence a great majority of the isocyanates used are diphenylmethane diisocyanates. Diphenylmethane diisocyanates are also referred to as polymethylene polyphenylisocyanates depending upon the manufacturer. These isocyanates have functionalities greater than 2 and may be used easily in one-shot systems. They also have a much lower toxicity than toluene diisocyanate and are much easier to control. Toluene diisocyanates are seldom used in rigid foams, since the difunctional intermediates do not give sufficient strength and rigidity. The toluene diisocyantes used in rigid foam systems now are all used in an adduct or prepolymer system, and although successful in capturing a portion of this market, they still form a rather minor portion of rigid foam systems in use.

The stoichiometry of urethanes is critical and the ratios of NCO to OH or other hydroxyl must be very closely controlled in order to achieve the end properties desired. Some formulations will call for a ratio of 1:1 and others will call for a high NCO, as much as 1.3:1 of the hydroxyl. A few formulations will call for ratios of hydroxyl that are higher than NCO. A few of these formulations may run 0.9:1. For almost all urethane formulations, however, NCO ratios will be equal to or slightly higher than the hydroxyl, usually in the range of 1.1:1. The formulator must first determine the available NCO in the ioscyanate component and the hydroxyl number of the polyol component. Accepted methods and equations for arriving at proper equivalents weights are discussed in "The Development and Use of Polyurethane Products", E. N. Doyle, McGraw-Hill Book Co., pp. 7-10 (1971).

The blowing agents which can be employed herein include water, liquefied gases which have boiling points below 27° C. (80° F.) and above −51° C. (−60° F.), or other inert gases such as nitrogen, carbon dioxide, helium and argon. Suitable liquefied gases include saturated aliphatic fluorohydrocarbons which vaporize at or below the temperature of the foaming mass. Such gases are at least partially fluorinated and can also be otherwise halogenated. Fluorohydrocarbon, chlorohydrocarbon, and chlorofluorocarbon blowing agents suitable for use in foaming the formulations herein include trichlorofluoromethane, dichlorodifluoromethane, dichlorofluoromethane, 1,1-chloro-1-fluoroethane, 1-chloro-1,1-difluoro, 2,2-dichloroethane, and 1,1,1-trifluoro-2-chloro-2-fluoro-3,3-difluoro-4,4,4-trifluorobutane. Today there are many replacements for the fully chlorinated and/or fluorinated hydrocarbons in most of which there is one hydrogen atom which has not been replaced with chlorine or fluorine. These blowing agents, referred to as HCFCs, are also useful herein.

The amount of blowing agent used will vary with the blowing agent used and the density desired in the foamed product. Usually about 15.5–16% by weight of the chlorinated fluorocarbons are used, based on the weight of the total mixture, for rigid foams. Usually a combination of water and chlorinated fluorocarbons or a combination of chlorinated fluorocarbons and methylene chloride or only methylene chloride are used for flexible foams, with the amounts used being about 2–4 parts by weight of water and about 10–20 parts by weight of chlorinated fluorocarbon or methylene chloride, based on the weight of the polyol.

Catalysts suitable for use herein include the conventional ones used in the polyurethane rigid and flexible foam art. Most formulations require a dual catalyst system, generally a tertiary amine and a smaller quantity of a metallic soap. The ratios of the two will depend entirely on the rise and gel times desired in the formulation.

Useful tertiary amines include: N-alkylmorpholines such as N-methyl morpholine, N,N-dialkylcyclohexylamines where the alkyl groups are methyl, ethyl, propyl, butyl, and the like; trialkylamines such as triethylamine, tripropylamine, tributylamine, triamylamine, and the like; triethylene diamine, bis(2-dimethylamineothyl) ether; N,N-dimethylaminoethyl-N',N'-dimethylaminopropyl ether; and other tertiary amines well known in the art. Tertiary amine catalysts suitable for use in the preparation of water-blown foams are also disclosed in U.S. Pat. No. 3,061,556. A formulation may contain widely varying percentages of these tertiary amines, depending on the processing conditions, curing conditions, and gel times desired.

The two most widely used metallic soaps are dibutyltin dilaurate in rigid foams and stannous octoate in flexible foams. The metallic soaps may be used in widely varying quantities depending upon the end application. The exact amount used is extremely critical and will affect rise and gel time far more than a much larger amount of amine catalyst.

Of course any suitable organic solvent for the catalysts can be used which does not substantially adversely affect the operation of the process or reactants. Examples of such solvents for the catalysts include polyols (e.g., 2-methyl-2,4-pentanediol), dipropylene glycol and the like.

The reaction mixture contains a foam stabilizer. Organosilicone surfactants useful as foam stabilizers contain one or more hydrophobic groups and one or more hydrophilic groups. The hydrophobic groups comprise a plurality of silicone atoms, generally in the form of repeating siloxane groups. The hydrophilic groups generally consist of a plurality of oxyalkylene radicals in the form of a chain of repeating units. In one type of silicone surfactant, the backbone of the molecule comprises a chain of siloxane groups to which are attached pendant polyoxyalkylene hydrophilic groups. In another type, a chain of alternating polysiloxane and polyoxyalkylene segments form the backbone of the molecule. In a third, less common type, the polymer backbone is formed by a carbon-to-carbon chain to which are attached silicone atoms and long chain hydrophilic groups. The various types of organosilicone surfactants for use in the manufacture of polyurethane foam are well known in the art, described extensively in the literature, and sold commercially. Some representative surfactants suitable for use herein in flexible foams are L-520, L-540, and L-6202 manufactured by Union Carbide Corp. Some representative surfactants suitable for use in rigid foams herein are DC-191, DC-193 and DC-196 manufactured by Dow Corning.

Organic surfactants useful as foam stabilizers include those discussed in the Background Of The Invention. Particularly preferred are the surfactants whose preparation is described in U.S. Pat. No. 4,572,919 and whose use in rigid foams, not flexible foams, is exemplified. The surfactants include the reaction products of (1) any unsaturated polyoxyalkylene adduct and (2) an esterified unsaturated dibasic acid or acid wherein the unsaturated diester component includes an amount of fumarate diester effective to bring about grafting of greater than 75%, preferably greater than 90%, by weight of the unsaturated diester component to the unsaturated polyoxyalkylene adduct.

Formulation of the various ingredients and components is carried out using standard techniques. In the formulation of flexible foams and plant-manufactured rigid foams each ingredient is normally added separately to the polyurethane mixture. In the formulation of premanufactured rigid foam systems, the catalyst(s), foam stabilizer(s), blowing agent(s) and any other ingredients are added to the polyol component provided hydrolytically-stable ingredients are used.

Typically, the process used to prepare premanufactured rigid foam systems comprises simultaneously reacting and foaming a reaction mixture containing:

(a) a first component comprising a diisocyanate or a polyisocyanate, and (b) a second component comprising one or more organic polyols, one or more foam stabilizers, one or more catalysts, and one or more blowing agents.

In the examples which follow all parts are by weight and all temperatures are in degrees Celsius unless otherwise noted.

EXAMPLES 1-3

These examples describe the preparation of rigid foams using a hydrocarbon oil having a high aromaticity and a high boiling point as a partial and total replacement for the silicone and organic surfactant foam stabilizers. The hydrocarbon oil used was a light yellow oil having an boiling point 343°-454° C. (650°-850° F.), a COC flash point of 175° C. (350° F.), a specific gravity at 15° C. (60° F.) of about 1.09-1.11, a density of 9.25 lb./gallon, a SUS viscosity at 37° C. (100° F.) of 148 sec., a pour point of −18° C. (0° F.), a moisture content of 0%, and an aromatic content about 95-97%. It is available from Crowley Chemical Co., New York, N.Y.

The ingredients used in each component are shown in Table I. The components are mixed together in a mixing zone, removed, and allowed to rise, gel, and cure.

The density of the resulting foams was about 1.8-2.0 lb./ft.$^3$ for Examples 1 and 2 (blown with Freon 11) and 2.8 lb./ft.$^3$ for Example 3 (blown with water).

In all of the above examples carbon dioxide or carbon dioxide and water can be used as a blowing agent.

EXAMPLES 4-10

These examples describe the preparation of flexible foams using the hydrocarbon oil described above in Examples 5-10 and using a hydrocarbon oil similar to that described above except that it had a narrower boiling point range (399°-454° C.; 750°-850° F.) in Example 4.

The ingredients used in each component are shown in Table II. The components are mixed together in a mixing zone, removed, and allowed to rise, gel, and cure.

The foam of Example 4 had a density of 1.5 lb./ft.$^3$. The foams of Examples 5-7 had densities of 1.0 lb./ft.$^3$. The foams of Examples 8-10 had a densities of 1.6 lb./ft.$^3$.

In all of the above examples, methylene chloride can be used as a blowing agent and carbon dioxide can be used alone or in combination with water as a blowing agent.

EXAMPLE 11 (comparative)

Highly aromatic hydrocarbon oils which were not as high boiling were evaluated in flexible and rigid foams.

Part A

A hydrocarbon oil having an aromaticity of 99% and a boiling point of 281°-443° C. (538°-830° F.) was used in formulations of Examples 1-10. No satisfactory foams were obtained.

Part B

A hydrocarbon oil having an aromaticity of 98% and a boiling point of 226°-299° C. (440°-570° F.) was used in formulations of Examples 1-10. No satisfactory foams were obtained.

Now that the preferred embodiments of the present invention have been described in detail, various modifications and improvements thereon will become readily apparent to those skilled in the art. Accordingly, the spirit and scope of the invention are to be limited only by the appended claims and foregoing specification.

TABLE 1

RIGID FOAMS

| Component | Name | Equivalent Weight of NCO:OH | Source | Example Numbers Amounts Used (g) 1 | 2 | 3 |
|---|---|---|---|---|---|---|
| A | diisocyanate | 2.9 × 1.07 | a | 412.0 | 412.0 | 135.0 |
| B | polyester polyol | 2.5 | b | 275.0 | 275.0 | — |
|   | polyether polyol | 2.5 | c | — | — | 70.8 |
|   | polyether polyol | 0.4 | d | 28.0 | 28.0 | 21.0 |
|   | tertiary amine catalyst | — | e | 0.2 | 0.2 | — |
|   | tertiary amine catalyst | — | f | — | — | 2.5 |
|   | tertiary amine catalyst | — | g | 0.2 | 0.2 | 0.5 |
|   | metallic catalyst | — | h | 0.2 | 0.2 | — |
|   | metallic catalyst | — | i | — | — | 1.5 |
|   | silicone surfactant | — | j | 3.3 | — | — |
|   | organic surfactant | — | k | — | 3.3 | — |
|   | hydrocarbon oil | — |   | 13.0 | 13.0 | 5.0 |
|   | water | — |   | — | — | 3.6 |
| C | blowing agent | — | l | — | — | — | a. Mondur 200 available from Mobay which is diphenylmethane diisocyante.
b. Terate Res 78 from Cape Chemical which is a polyester polyol having an OH number of 328, a viscosity of 10,000 cps. at 25° C., a specific gravity of 1.1., and a functionality of about 2.3.
c. Voranol 2070 from Dow Chemical which is a polyester polyol having a molecular weight of 700, specific gravity of 1.03, viscosity of 200 cps. at 25° C. or 75 cps. at 38° C., hydroxyl number of 238, boiling point (Penske Martin closed cup) of 232° C., and functionality of 3.
d. Voranol 800 from Dow Chemical which is a polyether, polyol having a molecular weight of 278, density of 8.75 lb./ft.$^3$, viscosity of 17,300 cps. at 25° C., hydroxyl number of 800, boiling point (Penske Martin closed cup) of 207° C., and functionality of 4.
e. Polycat 9 from Air Products which is a water-soluble tertiary amine having a flash point (closed cup) greater than 100° C., specific gravity of 0.8487 at 25° C., freezing point lower than −78° C., viscosity of 10 cps. at 20° C., vapor pressure of 8.89 mm. Hg at 38° C.
f. Polycat 5 from Air Products which is a water-insoluble tertiary amine having a flash point (closed cup) of 75° C., and a specific gravity of 0.83 at 25° C.
g. 33-LV from Air Products which is a water-soluble tertiary amine having a flash point (Penske Martin closed cup) of greater than 110° C., specific gravity of 1.13 at 24° C., viscosity of 100 cps. at 24° C., and vapor pressure of 2 mm. Hg at 38° C.
h. T-12 from M & T Chemicals which is dibutyl tin dilaurate.
i. T-45 from M & T Chemicals which is potassium octoate.
j. DC 193 from Dow Corning which is a silicone glycol polymer having a calculated OH number of 75, freezing point of 15° C., flash point (closed cup) of 92° C., viscosity of 425 cps. at 25° C., and specific gravity of 1.07 at 25° C.
k. FOAMSTAB 200 ® from Jim Walters Research which is described in U.S. Pat. No. 4,572,919.
l. Freon 11 which is trichlorofluoromethane.
It will be obvious to those skilled in the art that the addition of the various ingredients will be different in premanufactured systems and in plant manufactured foams.

TABLE 2

FLEXIBLE FOAMS

| Component | Name | Equivalent Weight of NCO:OH | Source | 4 | 5 | 6 | 7 | 8 | 9 | 10 |
|---|---|---|---|---|---|---|---|---|---|---|
| A | diisocyante |   | a | 9.0 | 50.0 | 50.0 | 50.0 | 50.0 | 50.0 | 50.0 |
| B | polyether triol |   | b | 100.0 | 100.0 | 100.0 | 100.0 | 100.0 | 100.0 | 100.0 |
|   | tertiary amine catalyst | — | c | 0.2 | 0.2 | 0.2 | 0.2 | 0.2 | 0.2 | 0.2 |
|   | metallic catalyst | — | d | 0.4 | 0.4 | 0.4 | 0.4 | 0.4 | 0.4 | 0.4 |
|   | silicone surfactant | — | e | — | 0.25 | — | — | 0.25 | — | — |
|   | organic surfactant | — | f | — | — | 0.25 | — | — | 0.25 | — |
|   | hydrocarbon oil |   |   | 4.0 | 3.0 | 3.0 | 4.0 | 3.0 | 3.0 | 4.0 |
|   | water |   |   | — | 4.0 | 4.0 | 4.0 | 4.0 | 4.0 | 4.0 |
| C | blowing agent |   | g. | 25.0 | 25.0 | 25.0 | 25.0 | — | — | — | a. Toluene diisocyante
b. Propoxylated glycerin having a molecular weight of 3000, OH number of 56, and viscosity of 2000-2500 cps. at 25° C.
c. Niax C-174 from Union Carbide which is a tertiary amine having a flash point (closed cup) of 83° F., viscosity of 9.6 cps. at 20° C., specific gravity (20/20) of 0.949, freezing point of < −75° C., vapor pressure of 0.3 mm. Hg, and density of 7.83 lbs./gal of 7.83.
d. T-9 from M & T Chemicals which is stannous octoate.
e. L-6202 from Union Carbide which is a silicone surfactant with a viscosity of 1300 cps. at 20° C. and a specific gravity of 1.030 at 25/25° C.
f. FOAMSTAB 200 ® from Jim Walters Research which is described in U.S. Pat. No. 4,572,919.
g. Freon 11 which is trichlorofluoromethane.
It will be obvious to those skilled in the art that the addition of the various ingredients will depend on the type of machine used in the manufacture of the foam.

What is claimed is:

1. In a process for preparing a rigid or flexible polyurethane foam, which comprises simultaneously reacting and foaming a reaction mixture containing as ingredients (a) a diisocyanate, a polyisocyante or mixtures thereof, (b) one or more organic polyols, the organic polyols and the diisocyantes and/or polyisocyanates being present in the mixture in a major amount and in an approximately stoichiometric amount as required to produce the polyurethane foam, (c) one or more blowing agents in a minor amount sufficient to foam the reaction mixture, (d) one or more catalysts for the production of the polyurethane foam in a catalytic amount, and (e) one or more foam stabilizers in an amount sufficient to stabilize the polyurethane foam, with the ingredients selected being suitable for the foam being prepared; the improvement which comprises adding a hydrocarbon oil having an aromaticity of at least about 85% and a boiling point of about 342° to about 510° C. to the polyol and/or polyisocyanate as a partial or complete replacement for the foam stabilizer.

2. The process of claim 1, wherein the hydrocarbon oil has an aromaticity of at least about 95%.

3. The process of claim 2, wherein the hydrocarbon oil has a boiling point of about 343°–454° C.

4. The process of claim 1, wherein the hydrocarbon oil has a boiling point of about 399° to about 454° C.

5. The process of claim 3, wherein the polyurethane foam is a rigid polyurethane foam; wherein the diisocyanate or polyisocyanate is an aromatic diisocyanate or polyisocyanate having a functionality of about 2.3 to about 2.9; wherein the polyol is a low molecular weight polyol having a functionality of at least about 2.2 and is selected from the group consisting of a polyether, an aminopolyether, a polyester, and mixtures thereof; wherein the blowing agent is selected from the group consisting of carbon dioxide, nitrogen, helium, a fluorohydrocarbon, a chlorohydrocarbon, a chlorofluorohydrocarbon, water, and suitable mixtures thereof; and wherein the catalysts are a tertiary amine and a metallic organic soap; and wherein the foam stabilizer is a silicone surfactant or an organic non-silicone surfactant.

6. The process of claim 3, wherein the polyurethane foam is a flexible polyurethane foam; wherein the diisocyanate or polyisocyanate is an aromatic diisocyanate or polyisocyanate having a functionality of about 2.0 to about 2.3; wherein the polyol is a high-molecular-weight polyol having a functionality of about 2 to about 3 and is selected from the group consisting of a polyether, a polyester, and mixtures thereof; wherein the blowing agent is selected from the group consisting of carbon dioxide, nitrogen, helium, methylene chloride, a fluorohydrocarbon, a chlorohydrocarbon, a chlorofluorohydrocarbon, water, and suitable mixtures thereof; wherein the catalysts are a tertiary amine and a metallic organic salt; and wherein the foam stabilizer is a silicone surfactant or an organic non-silicone surfactant.

7. The process of claim 3, wherein the sole blowing agent is water and wherein the hydrocarbon oil is added as a total replacement for the foam stabilizer.

8. The process of claim 5; wherein the diisocyanate is dipenylmethane diisocyanate; wherein the polyol is a polyester or polyether polyol having a functionality of about 3–4; and wherein the blowing agent is trichlorofluoromethane, water, a fluorocarbon containing a hydrogen atom, a chlorohydrocarbon containing a hydrogen atom, a chlorofluorohydrocarbon containing a hydrogen atom, or suitable mixtures thereof.

9. The method of claim 6, wherein the diisocyanate is toluene diisocyanate or diphenylmethane diisocyanate; wherein the polyol is a polyether triol, wherein the foam stabilizer is a silicone glycol polymer or a reaction product of an unsaturated polyoxyalkylene adduct and an esterified unsaturated dibasic acid or acid wherein the unsaturated diester component includes an amount of fumarate diester effective to bring about grafting of greater than 75% by weight of the unsaturated diester component to the unsaturated polyoxyalkylene adduct; and wherein the blowing agent is methylene chloride, trichlorofluoromethane, water, a fluorohydrocarbon containing a hydrogen atom, a chlorohydrocarbon containing a hydrogen atom, a chlorofluorohydrocarbon containing a hydrogen atom, or suitable mixtures thereof.

10. The polyurethane foam produced by the process of claim 1.

11. The polyurethane foam produced by the process of claim 2.

12. The polyurethane foam produced by the process of claim 3.

13. The polyurethane foam produced by the process of claim 4.

14. The polyurethane foam produced by the process of claim 5.

15. The polyurethane foam produced by the process of claim 6.

16. The polyurethane foam produced by the process of claim 7.

17. A process for reducing the crystallization temperature of a diisocyanate by forming a mixture consisting of a toluene diisocyanate or a diphenylmethane diisocyanate and about 3–8% by weight of a hydrocarbon oil having an aromaticity of at least 85% and a boiling point of about 281° to about 510° C.

18. The process of claim 17, wherein the diisocyanate is toluene diisocyanate, wherein the hydrocarbon oil has an aromaticity of at least about 95% and a boiling point of about 399° to 454° C., and wherein the crystallization temperature of the toluene diisocyanate is reduced to $-12°$ C.

19. A process for reducing the vapor pressure of a toluene diisocyanate by forming a mixture consisting of the toluene diisocyanate and about 3–10% weight of a hydrocarbon oil having an aromaticity of at least about 85% and a boiling point of about 281° to about 510° C.

20. The process of claim 19, wherein the hydrocarbon oil has an aromaticity of at least about 95% and a boiling point of about 399° to 454° C.

21. The process of claim 8, wherein the foam stabilizer is a silicone glycol polymer.

22. The process of claim 8, wherein the foam stabilizer is a reaction product of an unsaturated polyoxyalkylene adduct and an esterified unsaturated dibasic acid or acid wherein the unsaturated diester component includes an amount of fumarate diester effective to bring about grafting of greater than 75% by weight of the unsaturated diester component to the unsaturated polyoxyalkylene adduct.

23. The process of claim 9, wherein the foam stabilizer is a silicone glycol polymer.

24. The process of claim 9, wherein the foam stabilizer is a reaction product of an unsaturated polyoxyalkylene adduct and an esterified unsaturated dibasic acid or acid wherein the unsaturated diester component includes an amount of fumarate diester effective to bring about grafting of greater than 75% by weight of the unsaturated diester component to the unsaturated polyoxyalkylene adduct.

25. The polyurethane foam produced by the process of claim 1, wherein the hydrocarbon oil is the complete replacement for the foam stabilizer.

26. The polyurethane foam produced by process of claim 1, wherein the hydrocarbon oil is added in an amount sufficient to replace about 70 to about 90% of the foam stabilizer.

27. The polyurethane foam produced by the process of claim 21.

28. The polyurethane foam produced by the process of claim 22.

29. The polyurethane foam produced by the process of claim 23.

30. The polyurethane foam produced by the process of claim 24.

* * * * *